Sept. 22, 1970  S. P. ANDERSEN  3,530,449
METHOD AND APPARATUS FOR TRANSFERRING DATA FROM ROTARY BODIES
Filed May 3, 1966  3 Sheets-Sheet 1

INVENTOR
SVEND PRAG ANDERSEN
BY
ATTORNEYS

United States Patent Office 3,530,449
Patented Sept. 22, 1970

3,530,449
METHOD AND APPARATUS FOR TRANSFERRING DATA FROM ROTARY BODIES
Svend Prag Andersen, Valby-Copenhagen, Denmark, assignor to F. L. Smidth & Co., New York, N.Y., a corporation of Delaware
Filed May 3, 1966, Ser. No. 547,355
Claims priority, application Great Britain, May 4, 1965, 18,747/65
Int. Cl. G08c 19/22
U.S. Cl. 340—177                    12 Claims

ABSTRACT OF THE DISCLOSURE

A method of and apparatus for transferring information representative of the measured value of a condition within or on a rotary body to a receiver outside such rotary body is disclosed, wherein the value of such condition is measured within the rotary body, a signal is derived within the rotary body which is representative of the measured value and is converted into a form suitable for inductive transfer therefrom and such converted signals are transferred to a stationary receiver external of the rotary body.

---

Figure 1:
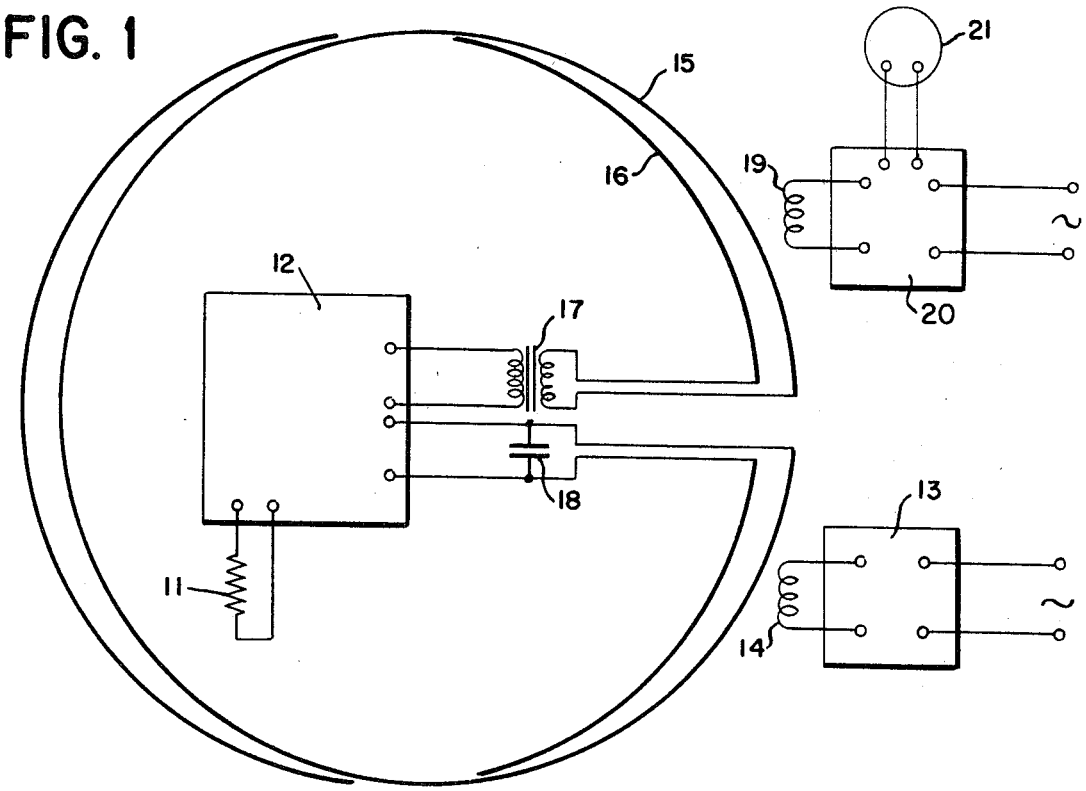

This invention relates to a method and apparatus for transferring data from a rotary body to monitor or control a process; and more particularly to a system for measuring one or more parameters of a process carried out in a rotary body and presenting the measurements to a stationary receiver located externally of the rotary body.

It is often important to be able to control and continuously supervise reactions occurring among materials being processed in a rotary apparatus. By rotary apparatus is meant apparatus of any sort which includes a rotatable chamber in which some process is carried out, herein referred to as a rotary body. In certain applications it is desirable to control or monitor parameters relating to the rotating parts of the apparatus itself. Measured parameters may include temperatures, which may be measured by thermocouples or by thermosensitive resistors (herein referred to as thermistors) mechanical forces such as torsion, which may be measured by strain gauges, or other such parameters relating to the rotary body itself or to its content.

Known methods of obtaining such measurements and transmitting them to a recording or monitoring unit mounted on a stationary portion of the machine involve transfer of signals representing the measurements through collector rings mounted on the rotary body to stationary brushes which cooperate with the collector rings to transmit the signals to the external monitors. The current amplitudes transmitted through such collector rings usually are low, so that the variable resistance losses inherent in such a collector ring system introduce error into the measurement as received by the external stationary circuit. Signals so obtained with known equipment are usable only to indicate the values of parameters measured and are not sufficiently reliable or error free to be of use in automatic control equipment. Moreover, wear on the collector brushes is high so that maintenance of any such installation is costly.

In order to overcome the above-mentioned disadvantages, the present invention provides a method of transferring signals representative of the measured value of a condition or parameter within a rotary body to a stationary receiver outside the rotary body. Broadly stated, the method involves measuring a value of a condition within a rotary body, deriving within such rotary body signals representative of the measured value, converting the signals to a form suitable for inductive transfer therefrom, and inductively transferring the signals so converted to a stationary receiver externally of the rotary body. Preferably the step of converting the electric signals to a form suitable for inductive transfer includes modulating an alternating current carrier waveform with a square wave having a mark-space ratio which varies according to the value of the measured parameter.

The present invention also provides apparatus for providing an indication at a point externally of a rotary body of a condition within such rotary body, comprising measuring means within such rotary body for measuring a parameter therein, a receiver mounted externally of such rotary body for receiving signals inductively coupled thereto, and means connected to the measuring means for inductively transferring signals derived therefrom to said receiver at substantially all angles of rotation of such rotary body. The stationary receiver may be an indicator, recorder, controller or other type of utilization device.

In a preferred embodiment of the invention, power is provided for the measuring unit on the rotary body from an external stationary power supply which is inductively coupled to the rotary body and which transfers power thereto in the form of high frequency current.

Figure 2:
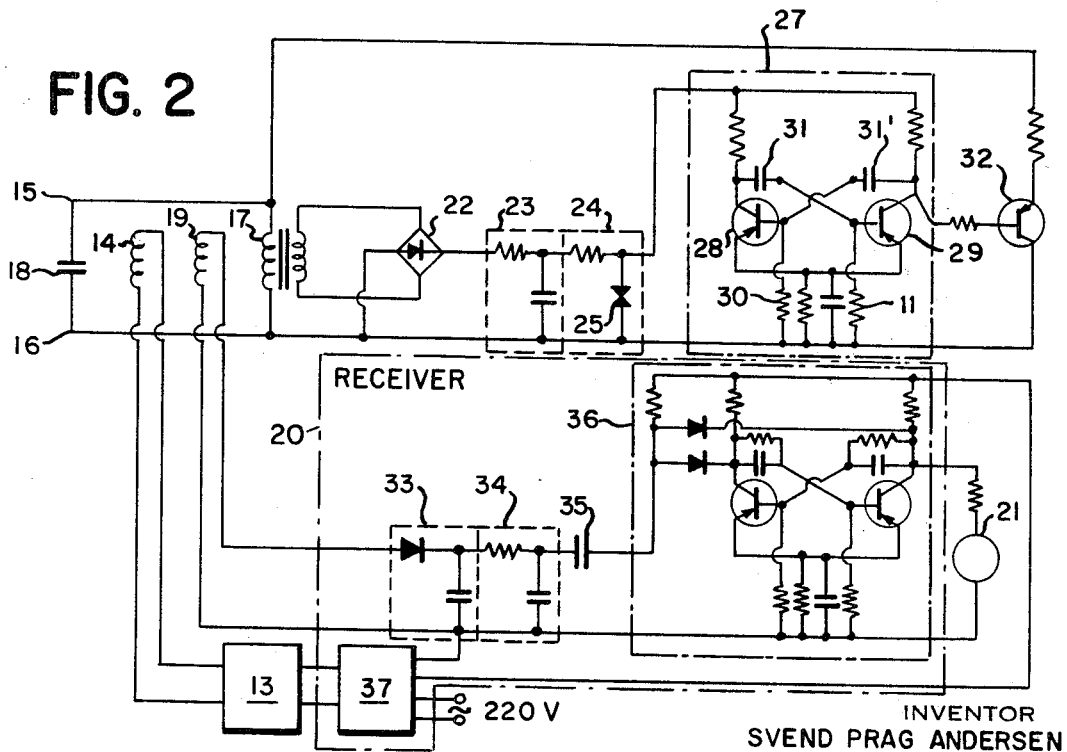
Figure 1A:
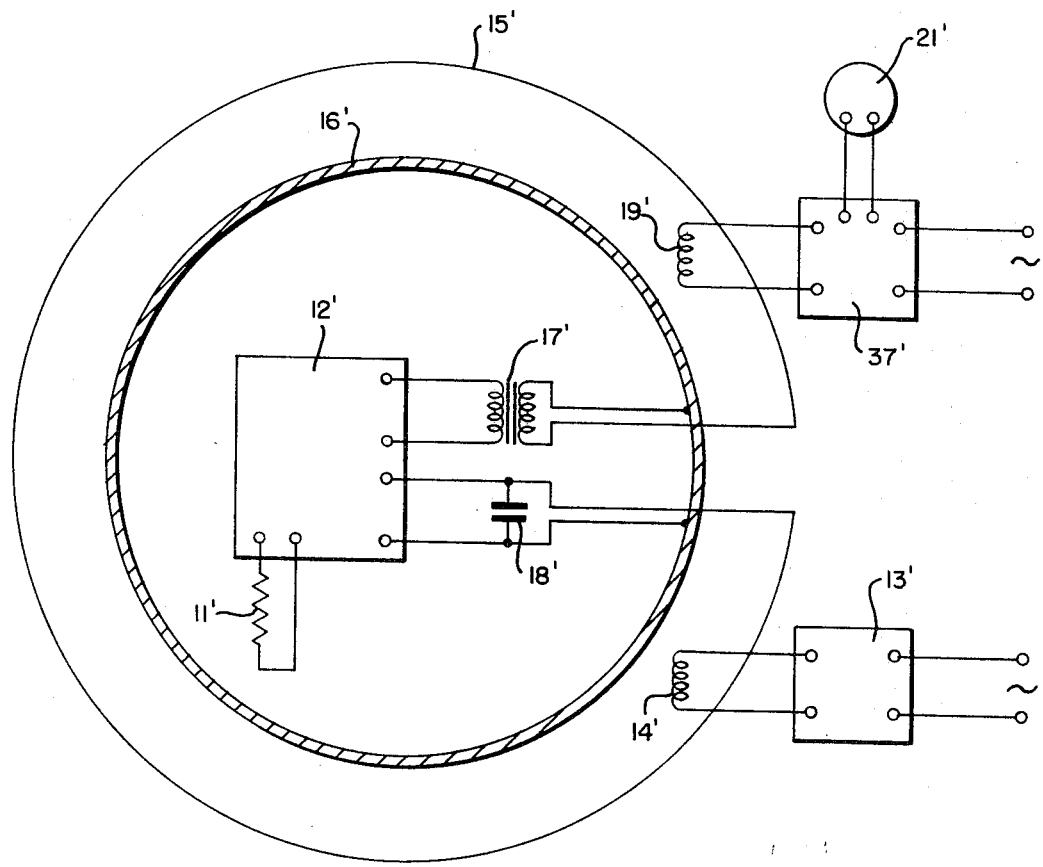
Figure 3:
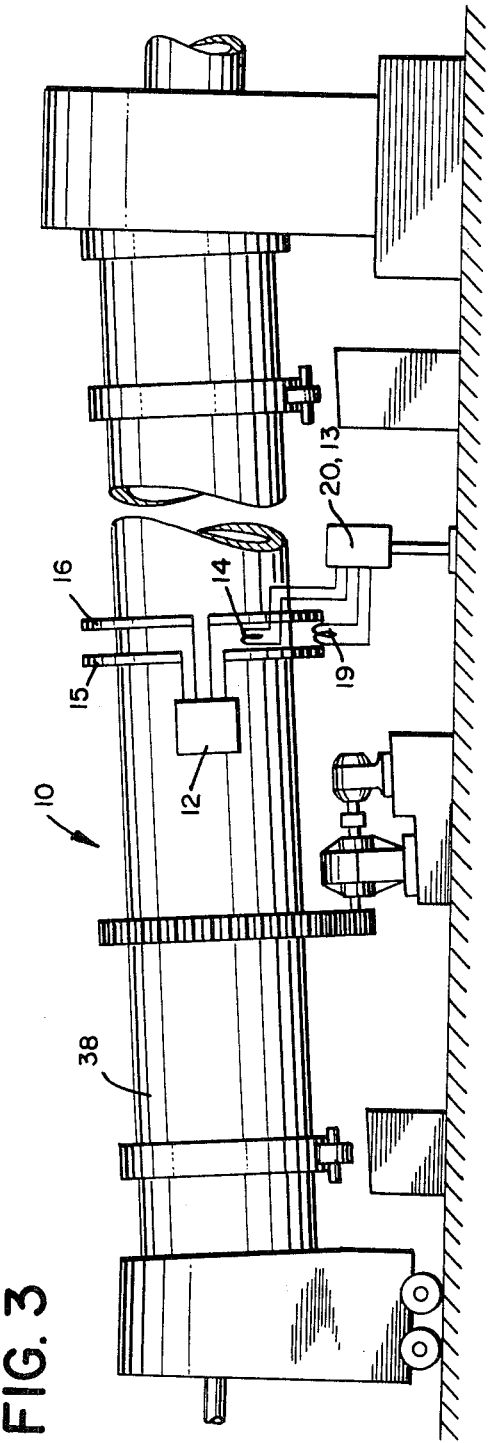
Figure 4:
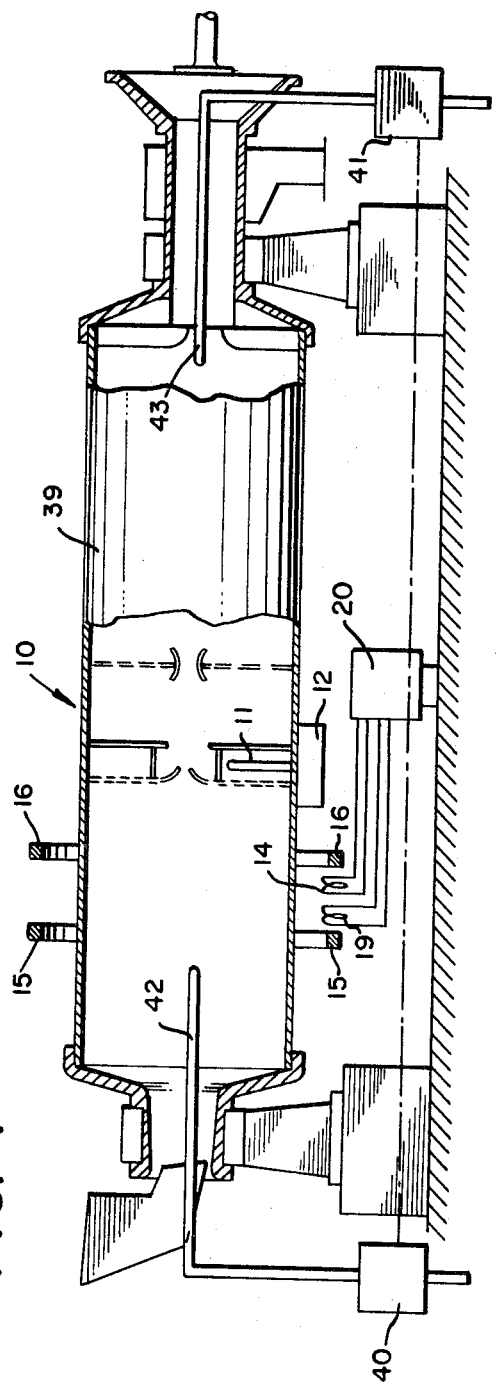

The invention will be further described with reference to the accompanying drawings, in which FIG. 1 is a schematic diagram of a measuring system embodying the invention, FIG. 1(a) is a schematic diagram of a measuring system embodying a form of the invention in which the kiln itself is one of the rings enabling inductive transfer, FIG. 2 is a detailed wiring diagram of various circuits incorporated in the embodiment of FIG. 1, FIG. 3 illustrates an application of the measuring apparatus to a rotary kiln, and FIG. 4 illustrates the use of such measuring apparatus in a cement mill.

FIGS. 1 and 2 illustrate an embodiment of the invention in which the temperature within a rotary body is continuously measured by a temperature-dependent resistor or thermistor 11, the resistance value of which varies according to its temperature in a known manner. The thermistor 11 forms part of a measuring unit 12 which is mounted on the rotary body and from which signals are derived representative of the instantaneous resistance of the thermistor.

FIG. 1(a) illustrates a device similar to that of FIG. 1 except that one of the conductive rings is constituted by the rotary body itself, which in this instance is electrically conductive. In FIG. 1(a), the primed reference numerals correspond to the unprimed reference numerals of FIG. 1.

The measuring unit is energized by means of a high frequency generator 13 to which coupling means in the form of an output coil 14 is connected. The coil 14 is inductively coupled to conductive rings 15 and 16 which substantially encircle the rotary body and which rotate with it. The conductive rings are insulated from the rotary body.

The measuring unit 12 is connected to the secondary winding of the transformer 17, the primary winding of which is connected across one adjacent pair of ends of the rings 15 and 16. The other pair of ends of these rings is also connected to the measuring unit 12, and is bridged by a capacitor 18. The capacitor 18 along with the primary winding of the transformer 17 and the rings 15 and 16 forms a ring circuit, the time constant of which may be adjusted by varying the capacitance of the capacitor. The output signal from the measuring unit 12 is applied to the rings 15 and 16, which are also inductively coupled to a receiver coil 19 forming part of the stationary receiver unit 20. The receiver unit 20 amplifies the signals and converts them to a form suitable for use in a readout instrument 21 which may, for example, be a recorder, display means or controller.

In the embodiment shown in FIGS. 1 and 2, the measuring unit 12 includes a rectifier 22 for converting a portion of the high frequency current to DC current to power a modulator, to be described, which converts the measurement indication given by the thermistor 11 to a modulating waveform. The measuring unit 12 also contains a filter 23 and a voltage regulator 24, the latter including a Zener diode 25. The DC voltage appearing at the output of the regulator 24 is used to bias a free-running multi-vibrator 27. The multi-vibrator circuit 27 includes a pair of transistors 28 and 29, each of which has an associated timing circuit. The timing circuit of transistor 28 includes base resistor 30 and coupling capacitor 31, while that associated with transistor 29 includes a coupling capacitor 31' and a base resistor which in this case is constituted by thermistor 11. These timing circuits govern the length of the mark and space periods which together make up the total period of the square wave output of the free-running multi-vibrator. Each of the mark and space periods is produced by a respective one of the two states of the multi-vibrator.

The square wave output from a collector of multi-vibrator 27 is fed to the input of a modulator 32, which is a transistor. The current passing through the modulating transistor 32 will be a high frequency signal modulated by the asymmetrical square wave. The modulator 32 thus modulates the high frequency carrier current present in the emitter-collector circuit of the modulator with the output square wave from the multi-vibrator 27 and feeds it to the ring circuit. The effect of a change in temperature at the thermistor 11 is to alter the mark space ratio (that is, the ratio of the lengths of time the multi-vibrator spends in each of its two states) of the multi-vibrator square wave output, thereby varying the modulation on the high frequency carrier current in the rings 15 and 16.

The receiver coil 19, by virtue of its inductive coupling to the rings 15 and 16, picks up the modulated carrier current waveform and conveys it to the receiver 20. In the receiver 20, the modulated carrier is first rectified by the rectifier 33 and then filtered in the high frequency filter 34, 35 to remove the high frequency components. The resulting rectified asymmetrical square wave is amplified and shaped by means of a bi-stable multivibrator 36 and fed to the readout unit 21. The signal may alternatively be utilized in a servo-system or the like for controlling and regulating the process performed in the rotary body.

In the example described above, the supply current for the measuring circuit on the rotary body is derived from an external power supply unit 37 and is transferred by induction in the form of a high frequency signal through the rings 15 and 16. The latter also inductively transfer signals from the measuring unit to the stationary receiver unit. It will be appreciated that it is also possible to provide the current supply for the measuring unit in the form of an electric battery or similar means mounted on the rotary body. The rings 15 and 16 of the ring circuit in the embodiment described above may be the usual collector rings mounted on the rotary body and electrically isolated therefrom. In some cases, the rotary body itself may constitute one of such rings. Moreover, the measuring element need not be a temperature sensitive device, but may be for example a strain gauge resistor or a voltage generator arranged to control the oscillations of the multi-vibrator.

In the example shown in FIG. 3, the measuring unit 12 and the rings 15 and 16 are mounted on a rotary kiln 38 in which a cement burning process occurs. The measuring device 12 provides continuous temperature readings of the material in the rotary kiln 38 at various stages in the process and may also be used to provide continuous temperature readings of the rotating body itself. In FIG. 4, the measuring device 12 is mounted in a tube mill 39 for grinding cement, and the cement temperature measurements may, after amplification, be used for the automatic control of a water injection system which includes control valves 40 and 41 interposed in water injection tubes 42 and 43. For purposes of this application, while measurements are referred to at various times as being made "within" a rotary body, this expression is intended to include measurements on the rotary body itself and such measurements may be taken within or without the body.

I claim:

1. A method of transferring signals representative of the measured value of a condition within a rotary body to a receiver outside such rotary body, comprising: measuring a value of a condition within a rotary body; deriving within such rotary body signals representative of the measured value; converting said signals to a form suitable for inductive transfer therefrom; and inductively transferring the signals so converted to a stationary receiver externally of the rotary body; said step of converting of signals including modulating an alternating current carrier waveform with a square wave having a mark-space ratio which varies according to the value of the measured parameter.

2. A method as defined in claim 1 including the step of inductively supplying power for the measuring and signal-deriving steps from a stationary source external to said body.

3. A method as defined in claim 2 wherein the power inductively supplied from the stationary source is in the form of high frequency current which serves as said alternating current carrier waveform, said conversion step including rectifying a portion of said high frequency current.

4. Apparatus for providing an indication at a point externally of a rotary body of a condition within such rotary body comprising:
   (a) measuring means within such rotary body for measuring a parameter therein;
   (b) a receiver mounted externally of such rotating body for inductively receiving signals;
   (c) means connected to said measuring means for inductively transferring signals representative of said parameter to said receiver at substantially all angles of rotation of such rotary body; and
   (d) said inductive means including means connected to the measuring means for generating a square wave having a mark-space ratio which varies in accordance with the value of the parameter measured by the measuring means, and a modulator for modulating a carrier wave with such square wave.

5. Apparatus as defined in claim 4 wherein said inductive transfer means includes a ring circuit substantially encircling such rotary body connected to receive the output of the converting means; said receiver includes first means inductively coupled to said ring circuit for receiving signals therefrom; and said apparatus includes power supply means having second means inductively coupled to the ring circuit for transferring power therethrough to said converting means in the form of high frequency current.

6. Apparatus as defined in claim 5 wherein said generating means is a free-running multi-vibrator and said first and second coupling means are coils inductively coupled to said ring circuit.

7. Apparatus as defined in claim 6 wherein said measuring element is a thermistor connected in circuit with the free-running multi-vibrator for varying the mark-space ratio of its output square wave.

8. Apparatus as defined in claim 7 wherein said ring circuit includes a pair of conductive rings substantially encircling said rotary body, and converting means include means for modulating the high frequency current in said ring circuit by said square wave; said receiver includes means for deriving a signal corresponding to the mark-space ratio of said square wave from the modulated high frequency carrier; said apparatus including read-out means connected to receive the output of said receiver.

9. Apparatus as defined in claim 8 wherein one of said pair of conductive rings is constituted by the rotary body.

10. Apparatus as defined in claim 8 wherein said read-out means is a process controller.

11. Apparatus as defined in claim 9 wherein said read-out means is an indicator.

12. Apparatus as defined in claim 6 wherein said measuring element is a strain gauge connected in circuit with said free-running multi-vibrator for varying the mark-space ratio of its output square wave.

References Cited

UNITED STATES PATENTS

| 2,607,004 | 8/1952 | Harris | 250—6 |
| 3,156,910 | 11/1964 | Tarbutton | 340—345 |
| 3,333,476 | 8/1967 | Hardy et al. | 73—362 |

THOMAS B. HABECKER, Primary Examiner

C. M. MARMELSTEIN, Assistant Examiner

U.S. Cl. X.R.

340—195, 206